US012427690B2

(12) United States Patent
Blosser et al.

(10) Patent No.: US 12,427,690 B2
(45) Date of Patent: Sep. 30, 2025

(54) BUNDLE BREAKER WITH SCRAP CHUTE

(71) Applicant: A. G. Stacker Inc., Weyers Cave, VA (US)

(72) Inventors: Jerry Blosser, Crimora, VA (US); Joseph Wunder, Lexington, VA (US); Randall Donn Senger, Mount Sidney, VA (US)

(73) Assignee: A. G. Stacker Inc., Weyers Cave, VA (US)

( * ) Notice: Subject to any disclaimer, the term of this patent is extended or adjusted under 35 U.S.C. 154(b) by 334 days.

(21) Appl. No.: 18/121,386

(22) Filed: Mar. 14, 2023

(65) Prior Publication Data

US 2023/0294320 A1 Sep. 21, 2023

Related U.S. Application Data

(60) Provisional application No. 63/319,786, filed on Mar. 15, 2022.

(51) Int. Cl.
*B26F 3/00* (2006.01)
*B26D 7/04* (2006.01)
(Continued)

(52) U.S. Cl.
CPC ................ *B26F 3/002* (2013.01); *B26D 7/04* (2013.01); *B26D 7/0675* (2013.01); *B26D 7/18* (2013.01); *B26F 2210/02* (2013.01)

(58) Field of Classification Search
CPC .. B26F 3/002; B26F 2210/02; Y10T 225/357; Y10T 225/00; Y10T 225/329;
(Continued)

(56) References Cited

U.S. PATENT DOCUMENTS 5,927,582 A * 7/1999 Duecker ................ B65H 35/10 225/2
6,019,267 A * 2/2000 Shill .................... B26D 7/1827 225/101
(Continued)

FOREIGN PATENT DOCUMENTS

CN 113389034 * 4/2021 ............... B26D 7/32
CN 115476223 * 12/2022 ......... B24B 27/0069
JP 2014161878 * 9/2014 ............. B21D 45/00

OTHER PUBLICATIONS

Machine translation—Amano (JP 2014161878).*
Machine translation—Cui (CN 113389034).*
Machine translation—Lu (CN 115476223).*

*Primary Examiner* — Adam J Eiseman
*Assistant Examiner* — Haleigh N Watson
(74) *Attorney, Agent, or Firm* — J-TEK LAW PLLC; Jeffrey D. Tekanic; Scott T. Wakeman

(57) ABSTRACT

A bundle breaker has downstream and upstream breaking supports, first and second platens located over the respective breaking supports and first and second actuators to move the platens to selectively clamp portions of a log against the breaking supports. A third actuator shifts the downstream breaking support relative to the upstream breaking support from a first position to a second position to break a bundle from the log. A scrap chute is mounted below a junction of the upstream and downstream breaking support to catch scrap material falling between the upstream support and the downstream breaking support. Each time the downstream breaking conveyor is shifted to the second position, scrap in the chute is jolted and is shifted toward a discharge opening of the scrap chute and, optionally, into a scrap drawer.

21 Claims, 13 Drawing Sheets

(51) Int. Cl.
*B26D 7/06* (2006.01)
*B26D 7/18* (2006.01)

(58) Field of Classification Search
CPC .... Y10T 225/371; B26D 7/0675; B26D 7/18; B26D 7/04; B26D 7/1827; B26D 2007/0018
USPC .......................................................... 225/101
See application file for complete search history.

(56) References Cited

U.S. PATENT DOCUMENTS

| | | | | |
|---|---|---|---|---|
| 6,655,566 | B1 * | 12/2003 | Martin | B26F 3/002 225/101 |
| 6,776,748 | B2 * | 8/2004 | Joux | B26D 7/1827 225/104 |
| 8,763,873 | B2 * | 7/2014 | Jans | B26F 3/002 225/96.5 |
| 2016/0075046 | A1 * | 3/2016 | Federowicz | B26D 1/04 83/111 |

* cited by examiner

BUNDLE BREAKER WITH SCRAP CHUTE

CROSS-REFERENCE TO RELATED APPLICATION

The present application claims the benefit of U.S. provisional patent application No. 63/319,786, filed Mar. 15, 2022, the entire contents of which is hereby incorporated by reference.

BACKGROUND

Many products are manufactured in elongated sheets that can be separated into individual blanks along scored or perforated or partially cut lines. For example, corrugated paperboard blanks, from which boxes and other structures may subsequently be formed, are often formed in this manner.

An elongated sheet of corrugated paperboard may be divided by score lines into, e.g., five separate blanks. The score lines generally run transversely, that is, perpendicular to the length of the elongated sheet. When a plurality of the sheets are arranged in a stack, the score lines are aligned vertically. Such a stack of elongated sheets made up of individual blanks is sometimes referred to as a "log." During the processing of logs, it is necessary to break individual stacks of sheets from the log along the vertically aligned score lines (sometimes referred to as a "breaking plane" or "breaking junction"). A stack of sheets that has been broken off a log may be referred to as a "bundle." The individual portions of the log that will be broken off the log may also be referred to as "bundles" even when they are still attached to each other in the log. Therefore, a log will comprise a plurality of bundles joined together at transverse score lines which bundles can be broken off the log one at a time to form individual bundles.

Machines that receive logs and break individual bundles from the logs are known as "bundle breakers." A bundle breaker generally includes two bottom support sections, each of which may include a conveyor, and two platens, one mounted over each support section. The downstream support section can tilt or pivot relative to the upstream support section. In operation, a log is moved along the bundle breaker until a score line between a first bundle of the log and a second bundle of the log is arranged at a junction of the first conveyor and the second conveyor, and the first bundle is then clamped against the downstream support section by the first platen and the second portion of the log is clamped against the upstream support section by the second platen. An actuator then shifts one of the support sections, usually the downstream support section, relative to the upstream support section to break the log along the score lines and separate the first bundle from the log. That first bundle is then moved away from the remaining portion of the log, and the log is shifted further downstream until the score lines separating the second bundle of the log from the third bundle of the log arrives at the breaking location at which time the process repeats until all bundles that formed the original log have been separated.

Scrap material may be present in the logs when they arrive at the bundle breaker. The scrap generally comprises small pieces of the corrugated material from which the sheets in each log are cut, which pieces were incompletely cut from the blanks when they are being formed, for example, or pieces of the corrugated material that are torn off the log by the breaking process. During operation of the bundle breaker, this scrap material may fall onto the upstream breaking conveyor and/or the downstream breaking conveyor or off the sides of or between the conveyors associated with the bundle breaker. When the scrap falls through gaps in the conveyors, particularly the gap at the break plane of the machine (at the gap between the upstream breaking conveyor and the downstream breaking conveyor or a gap at the downstream end of the downstream breaking conveyor, the scrap builds up beneath the bundle breaker and can eventually interfere with proper operation of the bundle breaker. The bundle breaker (and possibly other equipment in the lines that feed logs to and carry bundles away from the bundle breaker) must then be stopped to clean under the bundle breaker. This can be time consuming because the area under the bundle breaker is not easily accessible.

SUMMARY

This problem is addressed by embodiments of the present invention, a first aspect of which comprises a bundle breaker that has an upstream end and a downstream end and that includes an upstream breaking support with an input end and an output end, a downstream breaking support with an input end and an output end, a first platen located above the downstream breaking support, and a second platen located above the upstream breaking support. A first actuator is operably connected to the first platen and configured to shift the first platen toward a raised position above the downstream breaking support and toward a lowered position above the downstream breaking support to selectively clamp a first portion of a log between a bottom contact surface of the first platen and the downstream breaking support, and a second actuator operably connected to the second platen and configured to shift the second platen toward a raised position above the upstream breaking support and toward a lowered position above the upstream breaking support to selectively clamp a second portion of the log between a bottom contact surface of the second platen and the upstream breaking support. A third actuator is configured to shift the downstream breaking support relative to the upstream breaking support from a first position to a second position to break the first portion of the log from the second portion of the log, and a scrap chute is provided at a junction of the output end of the upstream breaking support and the input end of the downstream breaking support to catch scrap material falling between the upstream support and the downstream breaking support, and, optionally, to guide the scrap toward a scrap drawer.

BRIEF DESCRIPTION OF THE DRAWINGS

These and other aspects and features of the invention will be better understood after a reading of the following detailed description in connection with the attached drawings wherein.

DETAILED DESCRIPTION

Figure 1:
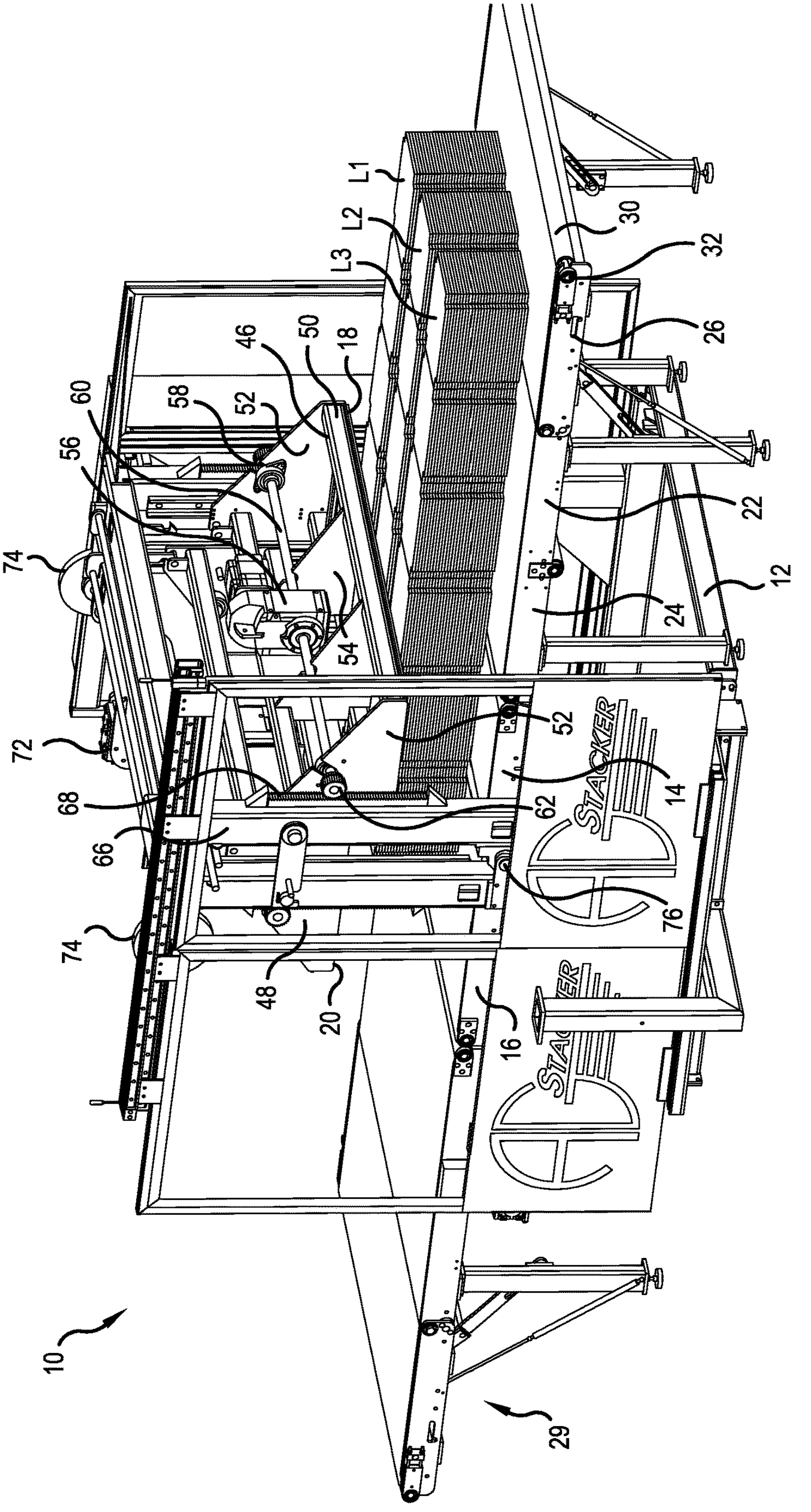
FIG. 1 is a perspective view of a bundle breaker supporting three logs.

Referring now to the drawings, wherein the showings are for purposes of illustrating presently preferred embodiments of the invention only and not for the purpose of limiting same, FIG. 1 shows a bundle breaker 10 according to the present disclosure. The bundle breaker 10 includes a frame 12 supporting an upstream breaking conveyor 14 and a downstream breaking conveyor 16. A first platen 18 is mounted to the frame 12 above the upstream breaking conveyor 16, and a second platen 20 is mounted to the frame 12 above the downstream breaking conveyor 16.

The first platen 18 is connected to the frame 12 by a first platen support 46, and the second platen 20 is connected to the frame 12 by a second platen support 48. The first platen support 46 will primarily be discussed hereafter, it being understood that the second platen support 48 is substantially identical thereto. The first platen support 46 includes a bottom frame 50 to which the first platen 18 is attached, first and second side plates 52, a motor mount 54 supported by the bottom frame 50 at a location between the first and second side plates 52 and a motor 56 supported by the motor mount 54. Each of the side plates 52 has inner sides that face the motor 56 and outer sides that face away from the motor 56. Each of the side plates includes a notch 58, and a drive shaft 60 extends from either side of the motor 56 through the notches 58. A drive gear 62 is mounted at each end of the drive shaft 60 on the outer sides of the side plate 52.

Figure 2:
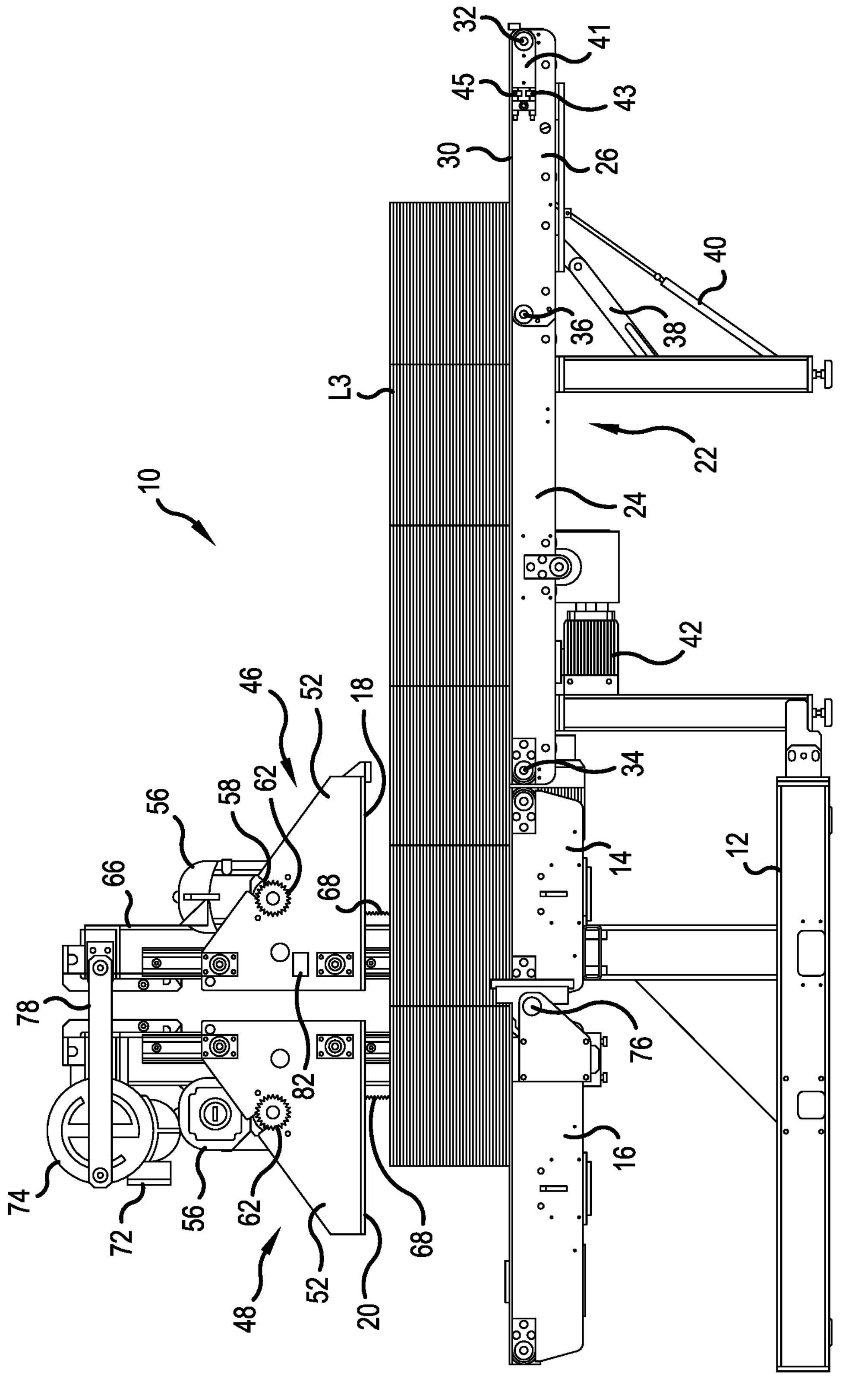
FIG. 2 is a side elevational view of the bundle breaker of FIG. 1 showing a first bundle of each log positioned between a downstream breaking conveyor and a first platen and a second bundle of each log positioned between an upstream breaking conveyor and a second platen.

The bundle breaker 10 further includes a breaking motor 72 operably connected to a drive disk 74 both of which are mounted on the vertical frame members 66 of the downstream breaking conveyor 14. The breaking motor 72 is preferably a servo gear motor with torque feedback similar or identical to the motors 56 used to raise and lower the first and second platen supports 46, 48. The downstream breaking conveyor 16 is pivotably connected to the upstream breaking conveyor 14 at a hinge 76. A connecting arm 78 (FIGS. 2-4) is connected between a peripheral edge of the drive disk 74, and the vertical support 66 of the upstream breaking conveyor 14. The breaking motor 72 is configured to rotate the drive disk 74 from a first position illustrated in FIG. 3 to a second position illustrated in FIG. 4 which causes the downstream breaking conveyor 16 to pivot about the hinge 76 such that the top surface of the downstream breaking conveyor 16 is no longer substantially coplanar with the top surface of the upstream breaking conveyor 14.

The operation of the bundle breaker 10 will now be described.

The first platen support 46 and the second platen support 48 are lowered by controlling the motors 56 on the first and second platen supports 46, 48 to rotate the drive shafts 60 and cause the drive gears 62 to move along the racks 68 and thus move the first and second platen supports 46, 48 toward the logs beneath the first and second platens 18, 20. The platen supports 46, 48 are lowered until they contact and clamp the logs against the upstream breaking conveyor 16 and the downstream breaking conveyor 18, respectively.

The clamping force applied against the log is increased until a predetermined clamping pressure is obtained. The controller C, upon receiving a signal that the desired clamping force has been obtained controls the motors 56 to stop the downward movement of the first and second platen supports 46, 48.

Figure 3:
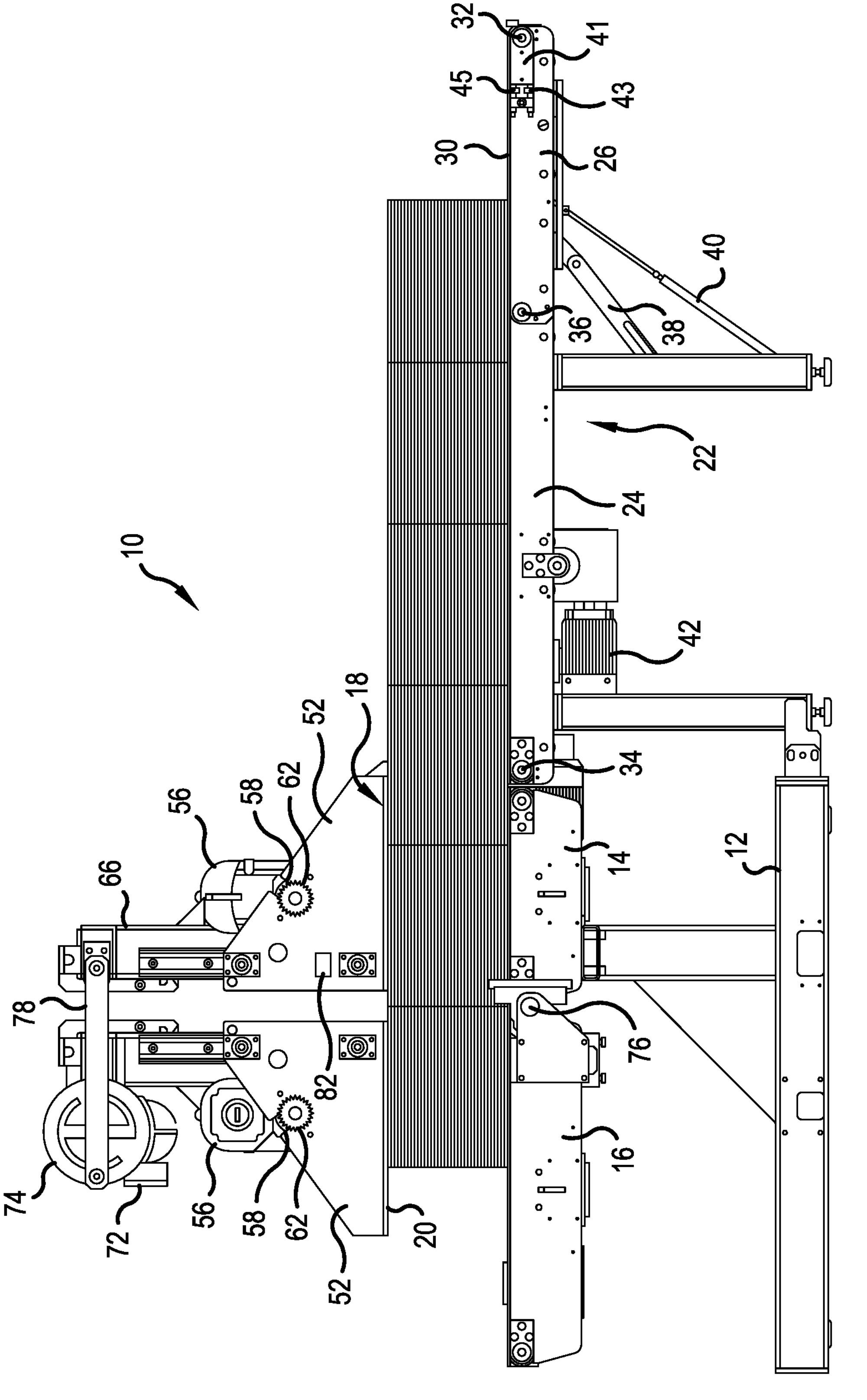
FIG. 3 is a side elevational view of the bundle breaker of FIG. 2 showing the first platen pressing the first bundles against the downstream breaking conveyor and the second platen pressing the second bundles against the upstream breaking conveyor.

FIG. 3 shows the first and second platen supports 46, 48 in the lowered position and pressed against the logs.

Figure 4:
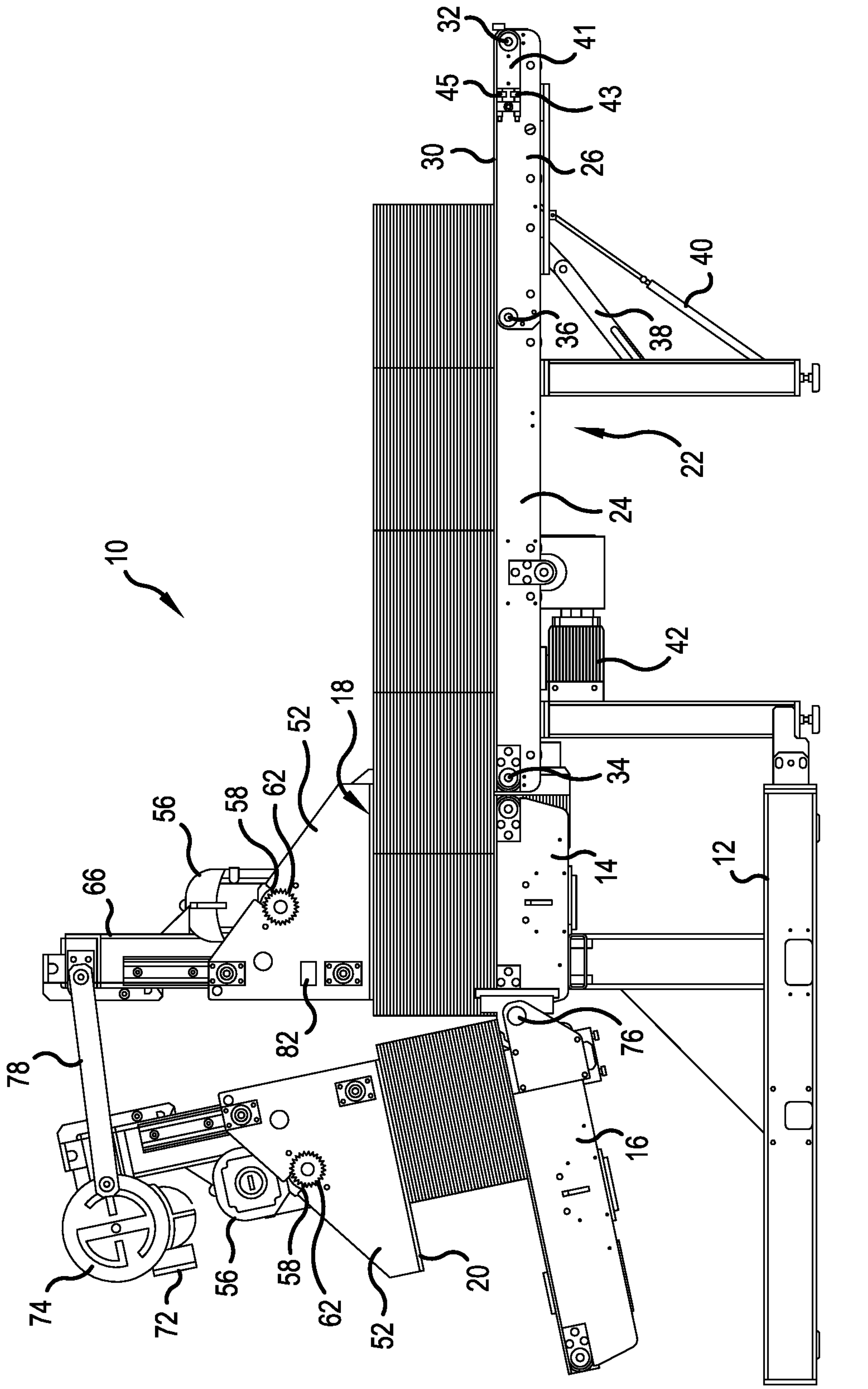
FIG. 4 is a side elevational view of the bundle breaker of FIG. 2 showing the downstream breaking conveyor shifted relative to the upstream breaking conveyor and the first bundles broken off the logs.

With the first bundle of the log is clamped between the second platen 20 and the downstream breaking conveyor 16 and the second bundle of the log is clamped between the first platen 18 and the upstream breaking conveyor 14, the controller C causes the breaking motor 72 to rotate the drive disk 74 to shift the downstream breaking conveyor 16 about the hinge 76 from the position illustrated in FIG. 3 to the position illustrated in FIG. 4, thereby breaking the first bundles from each of the logs.

As discussed above, scrap material may be present in the logs when they arrive at the bundle breaker 10. When the scrap falls through gaps in the conveyors, particularly the gap at the break plane of the machine (at the gap between the upstream breaking conveyor 14 and the downstream breaking conveyor 16), or a gap at the downstream end of the downstream breaking conveyor 16, the scrap builds up beneath the bundle breaker 10 and can eventually interfere with proper operation of the bundle breaker 10.

To address this problem, the present disclosure includes a scrap chute 100 which is shown by itself (not attached to the bundle breaker 10) in FIGS. 6-9. As discussed below, the scrap chute 100 is intended to be attached to the bundle breaker 10 with the open end 102, sometimes referred to as a "discharge opening" of the scrap chute 100 facing in the downstream direction (relative to the movement of logs and bundles through the bundle breaker). The open end 102 will therefore be referred to as the "downstream end" of the chute 100, and other elements of the scrap chute 100 will also described relative to the direction that logs are intended to move through the bundle breaker 100.

The scrap chute 100 includes a floor 104, an upstream end wall 106, a first side 108 (which is closest to the viewer in FIGS. 10-13) that includes a rear wall portion 110 and an angled front wall portion 112, and a second side 114 opposite the first side 108 which second side 114 includes a rear wall portion 116 and an angled front wall portion 118. These walls together form at least one side wall of the scrap chute 100. As will be appreciated from FIGS. 6-9, the height of the scrap chute 100 at the downstream end is greater than the height of the upstream end wall 106, and the heights of the first side 108 and the second side 114 decrease in the direction from the downstream end to the upstream end. A lip 120 may be provided at the downstream edge of the bottom wall 104 at the open end 102 which lip depends below the plane of the bottom wall 104.

The scrap chute 100 may be formed of sheet metal, plastic or other material that has the strength to withstand the use the scrap chute 100 discussed below. Preferably the material used to form the bottom wall 104 has (or is coated/treated to have) a relatively low coefficient of friction to facilitate sliding movement of scrap along the bottom wall 104. The scrap chute may be formed as a unitary structure, that is, as a one-piece structure with no moving parts.

Referring now to FIGS. 10-16, the scrap chute 100 is attached beneath the downstream breaking conveyor 16 via brackets (not illustrated) or by attaching the first and second sides 108, 114 directly to the structure of the downstream breaking conveyor 16 so that the scrap chute 100 moves with the downstream breaking conveyor 16 when it pivots during a breaking operation. The upstream end wall 106 is positioned somewhat upstream of the breaking plane or just under the downstream end of the upstream breaking conveyor 14 in order to catch substantially all scrap that falls through the gap between the upstream and downstream breaking conveyors 14, 16. The width of the scrap chute 100 is substantially the same as the width of the downstream breaking conveyor 16 to maximize the amount of falling scrap that is captured by the scrap chute 100.

Furthermore, the scrap chute 100 is mounted to the downstream breaking conveyor 16 so that the bottom wall 104 is angled about 10 degrees relative to the horizontal (angled downward in the downstream direction) when the top surface of the downstream breaking conveyor 16 is horizontal.

The bundle breaker 100 also includes a scrap drawer 122 (or scrap pan) that is slidably supported by rails 124 that are mounted on the frame of the bundle breaker 10 and extend transversely to the log-travel direction. The scrap drawer 122 has an open top 126 and is located beneath the downstream end 102 of the scrap chute 100. A guide wall 128 extends away from the downstream edge of the open top 126 of the scrap drawer 122 at an angle to help direct falling scrap into the scrap drawer 122.

During operation of the bundle breaker 10, scrap that is present at the downstream end of the upstream breaking conveyor 14 will tend to drop into the scrap chute 100. The scrap may be located on the surface of the upstream breaking conveyor 14 in which case the movement of the upper surface of the upstream breaking conveyor 14 will carry the scrap off the downstream end of the upstream breaking conveyor 14 and drop the scrap into the scrap chute 100. Or, the scrap may be produced by the breaking operation itself. Such scrap will tend to drop through the gap between the upstream breaking conveyor 14 and the downstream breaking conveyer 16 when the downstream breaking conveyor 16 is in its lowered position immediately after a breaking operation has been performed. Because the upstream wall 106 of the scrap chute 100 is positioned slightly upstream from the breaking plane and under the downstream end of the upstream breaking conveyor 14 (by a few inches, for example), substantially all such scrap material present at the gap between the upstream breaking conveyor 14 and the downstream breaking conveyor 16 should fall into the open top 126 of the scrap chute 100.

Similarly, scrap that drops off the downstream end of the downstream breaking conveyor 16 may drop directly into the scrap drawer 122 or be guided into the scrap drawer 122 by the guide wall 128 if the scrap does not drop directly over the open top 126 of the scrap drawer.

Figure 12:
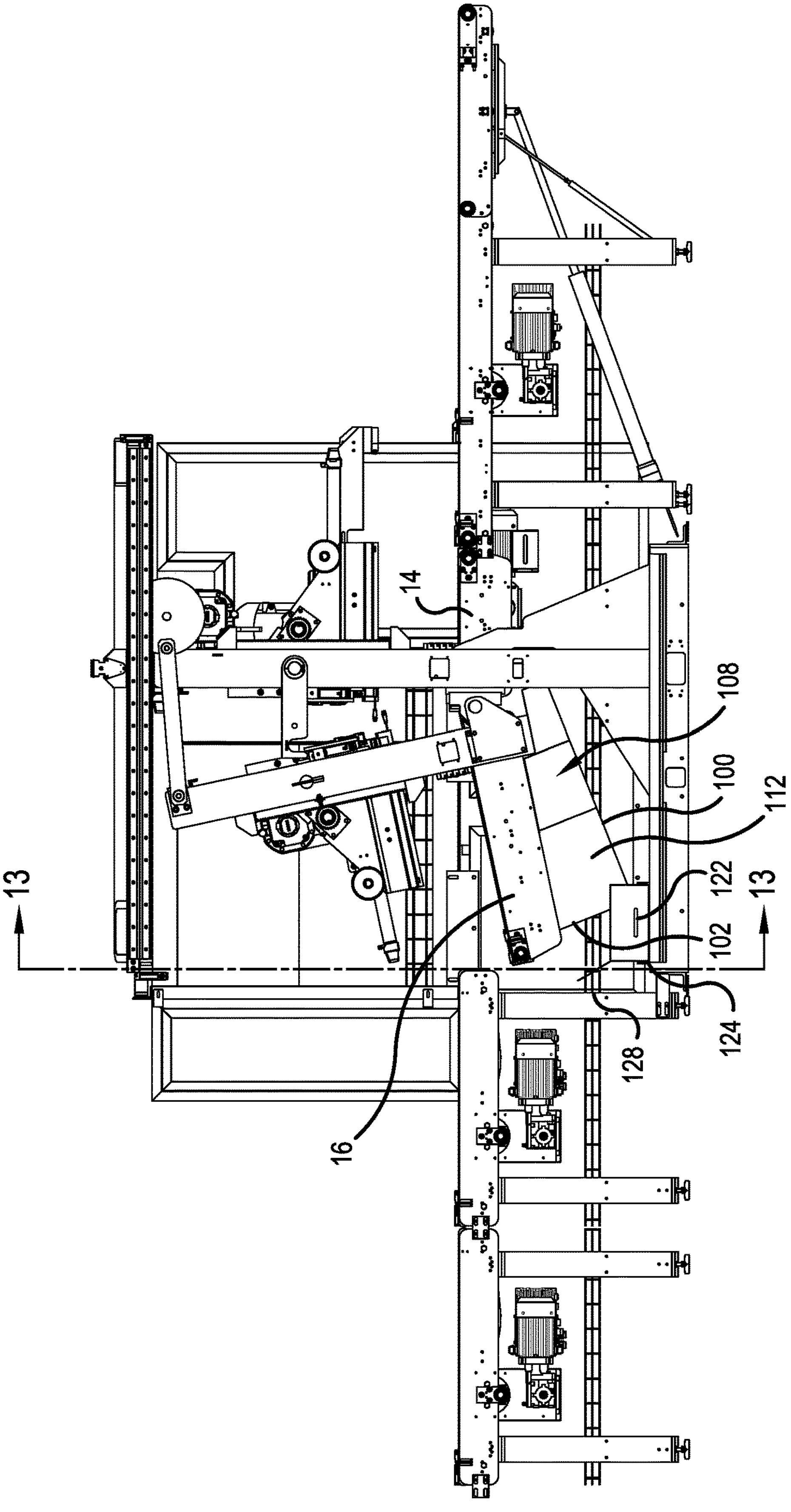
FIG. 12 is a side elevational view of the bundle breaker of FIG. 10 with the downstream breaking conveyor in the lowered or breaking position.
Figure 13:
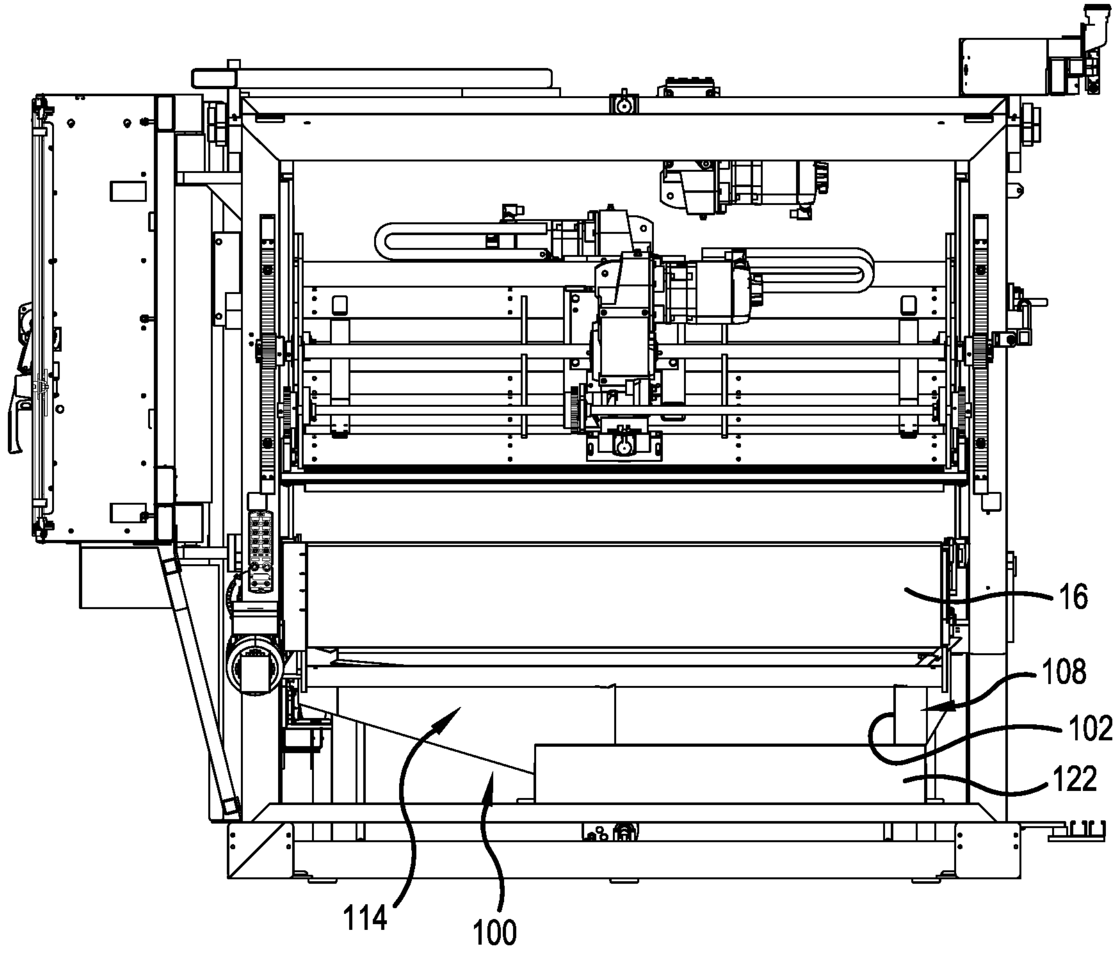
FIG. 13 is a sectional elevational view taken in the direction of line A-A in FIG. 12.
Figure 14:
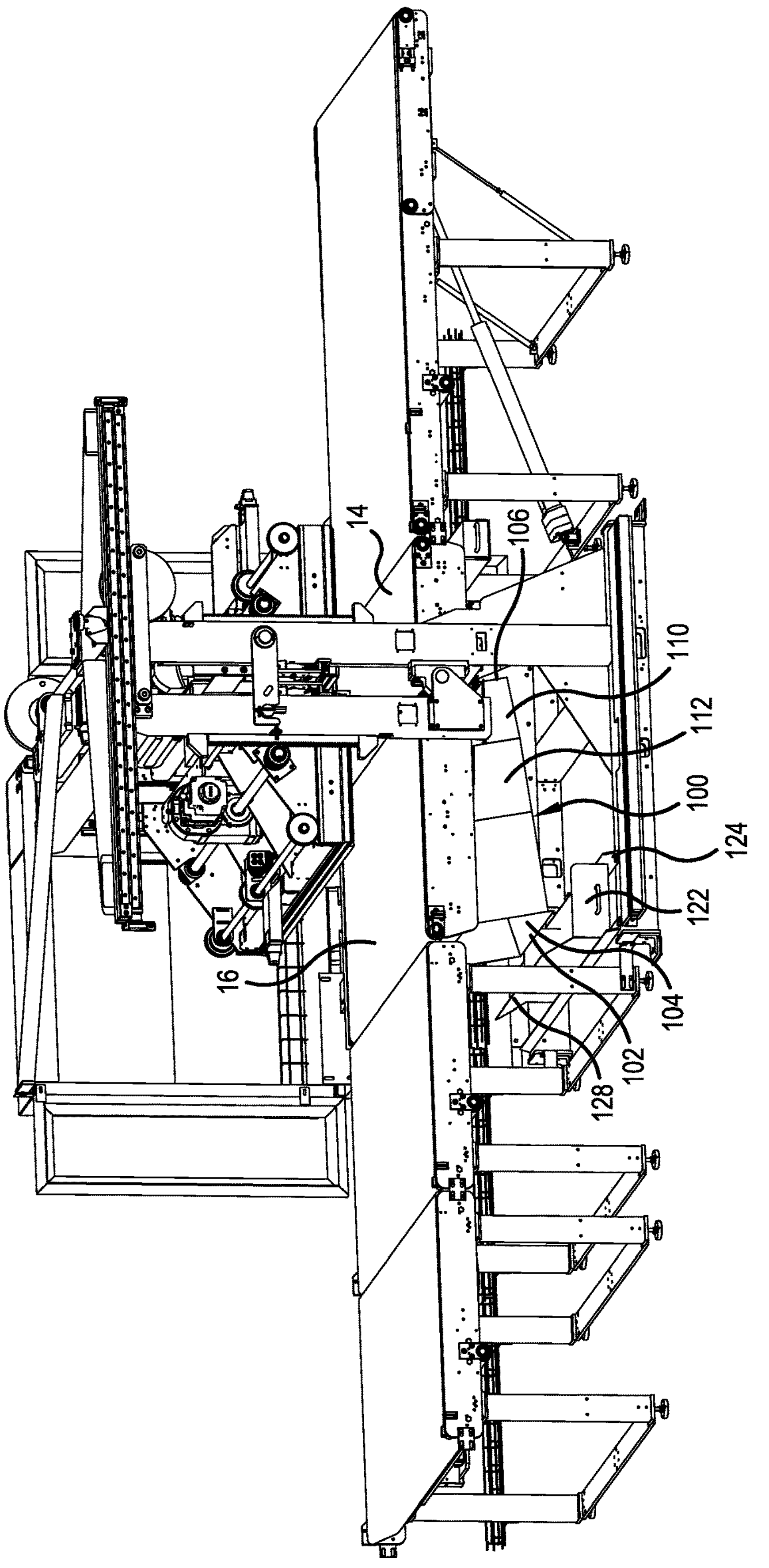
FIG. 14 is a perspective view of the bundle breaker of FIG. 10.
Figure 15:
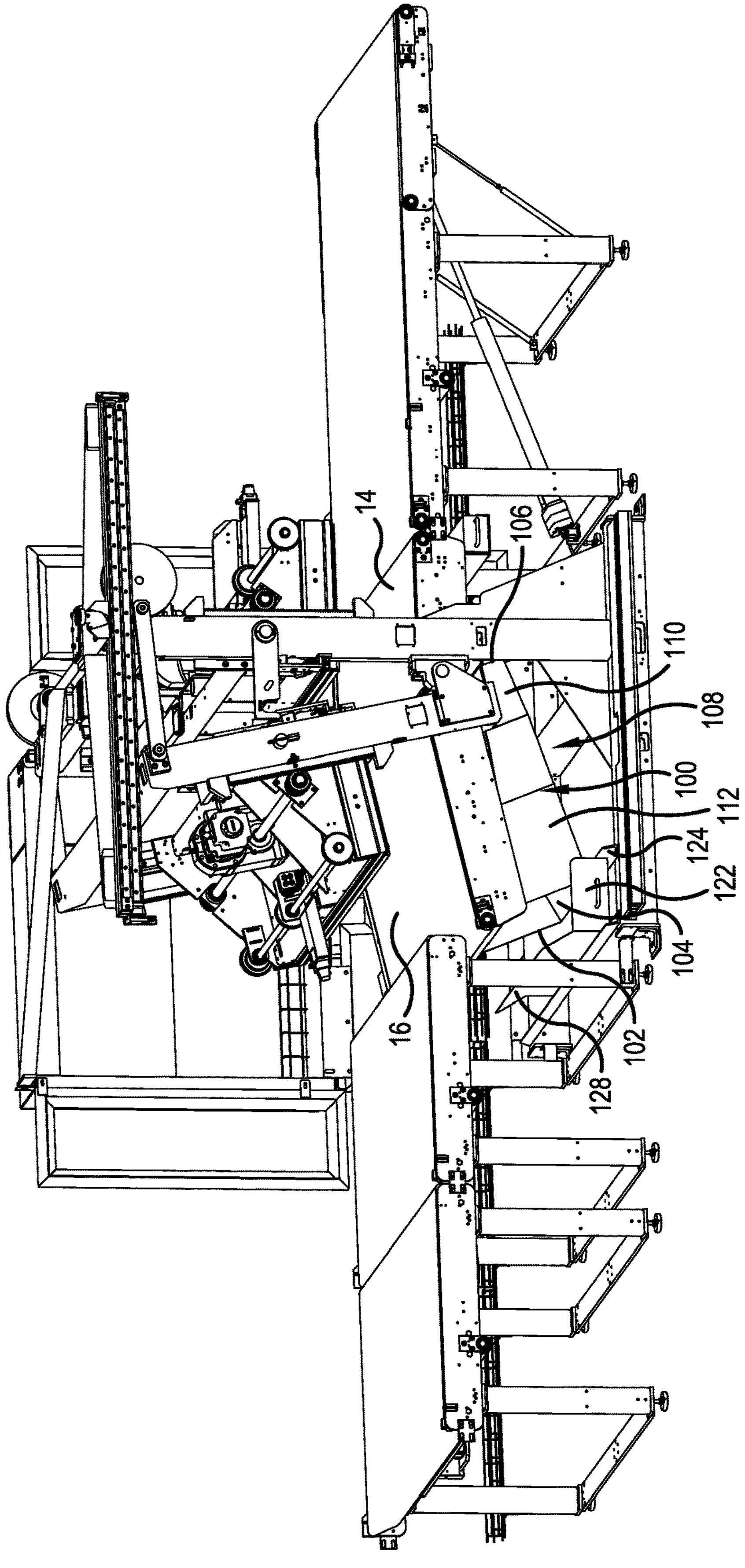
FIG. 15 is a perspective view of the bundle breaker of FIG. 12.
Figure 16:
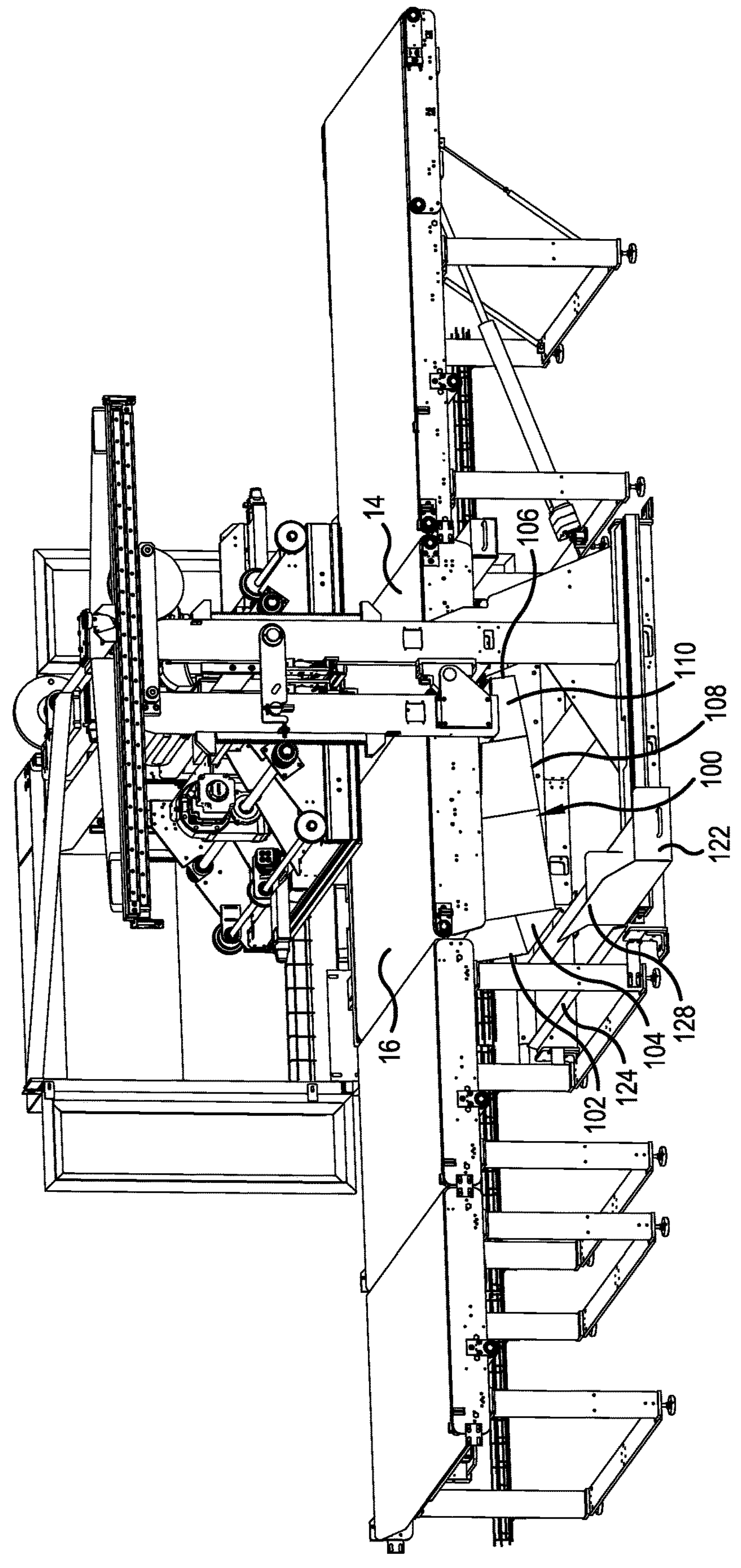
FIG. 16 is a perspective view of the bundle breaker of FIG. 12 in the second configuration with a scrap drawer in an extended position.

The approximately 10 degree angle of the bottom wall 104 of the scrap chute 100 relative to the horizontal and relative to the plane of the support surface of the downstream breaking conveyor 16 is insufficient to cause most scrap material to slide out the open end 102 of the scrap chute 102 and into the scrap drawer 122 when the top of the downstream breaking conveyor 16 is horizontal. However, at the end of a breaking operation, as shown in FIGS. 12 and 15, the top surface of the downstream breaking conveyor tilts approximately 12 degrees from horizontal, which leaves the bottom wall 104 of the scrap chute 100 angled at about 22 degrees from horizontal. Furthermore, the movement of the downstream breaking conveyor 16 to the lowered position stops abruptly when the downstream breaking conveyor 16 impacts against stops (not shown) or the drive mechanism moving the downstream breaking conveyor 16 comes to a sudden stop. The increasing angle of the bottom wall of the scrap chute 100 in conjunction with the sudden jolt provided by the stoppage of the downstream breaking conveyor 16 tends to shake scrap in the scrap chute toward the open end 102 of the scrap chute 100 and eventually into the scrap drawer 122. That is, all the scrap in the scrap chute 100 may not exit the scrap chute 100 each time the downstream breaking conveyor 16 cycles, but each cycle of the downstream breaking conveyor 16 should shake the scrap closer to the open end 102 of the scrap chute 100 until the scrap drops into the scrap drawer 122.

While the downstream opening 102 of the scrap chute is shown offset to one side relative to the rear wall 116, the downstream opening 102 could just as easily be offset in the other direction or centered relative to the rear wall 116 or extend across the entire width of the scrap chute 100.

When the downstream breaking conveyor 16 is in the lowered position of FIG. 12, the lip 120 projects into the scrap drawer 122 to help ensure that all scrap leaving the open end 102 of the scrap chute 100 falls into the scrap drawer 122.

Periodically, or when the scrap drawer 122 become full, the scrap drawer 122 can be pulled along the rails 124 out from under the downstream breaking conveyor 16 and emptied.

Figure 5:
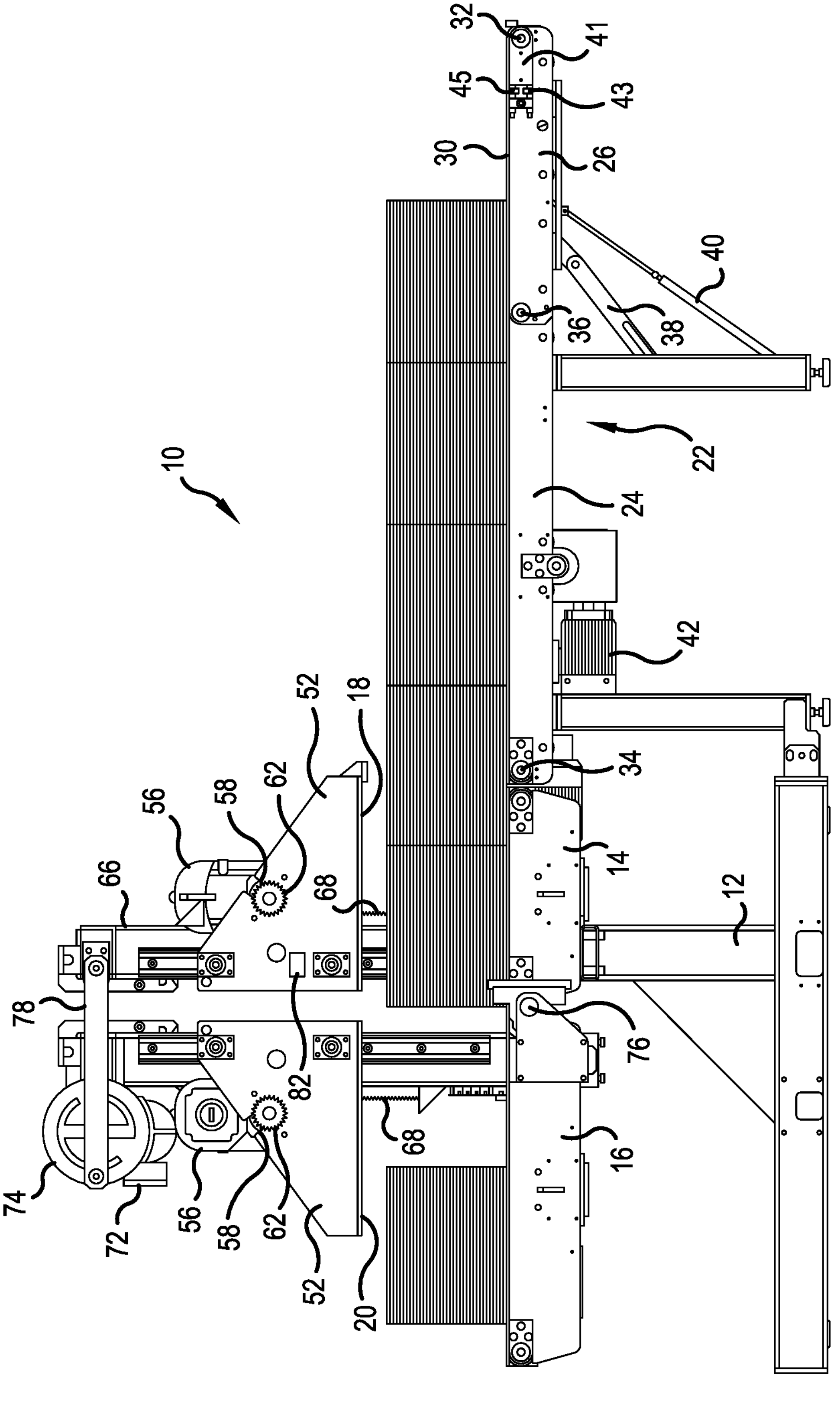
FIG. 5 is side elevational view of the bundle breaker of FIG. 2 showing the downstream breaking conveyor returned to a starting position with its top surface substantially coplanar with the top surface of the upstream breaking conveyor and the first bundles moved away from the logs.
Figure 6:
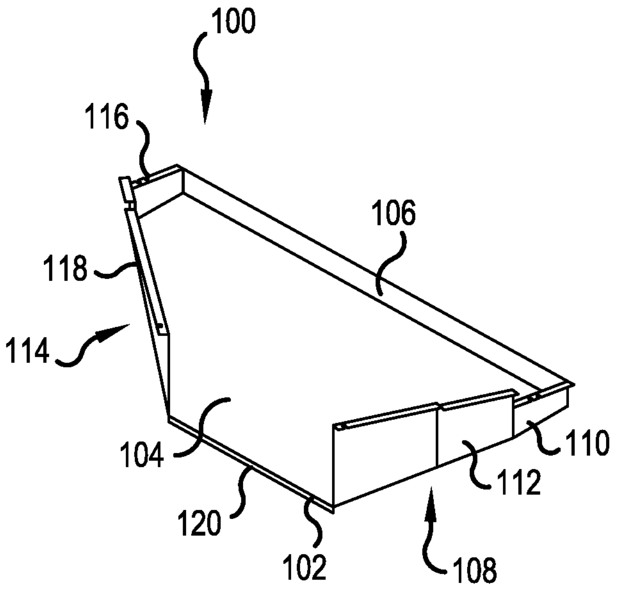
FIG. 6 is a perspective view of a scrap chute according to an embodiment of the present disclosure for use with the bundle breaker of FIGS. 1-5.
Figure 9:
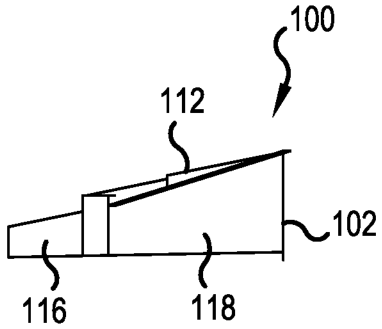
FIG. 9 is a side elevational view of the scrap chute of FIG. 6.
Figure 7:
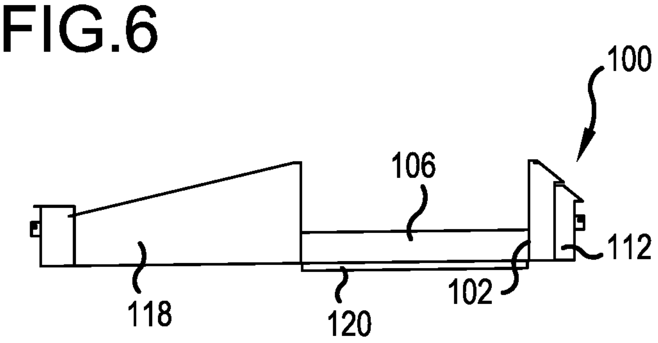
FIG. 7 is a front elevational view of the scrap chute of FIG. 6 looking at the discharge end of the scrap chute.
Figure 8:
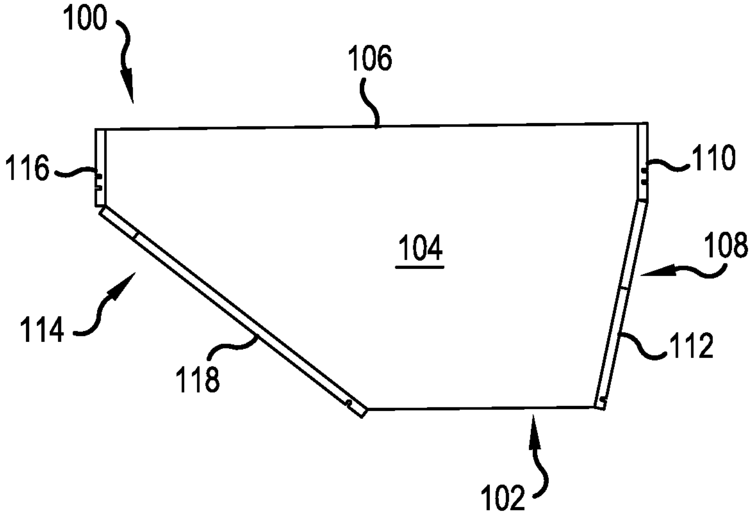
FIG. 8 is a top plan view of the scrap chute of FIG. 6.
Figure 10:
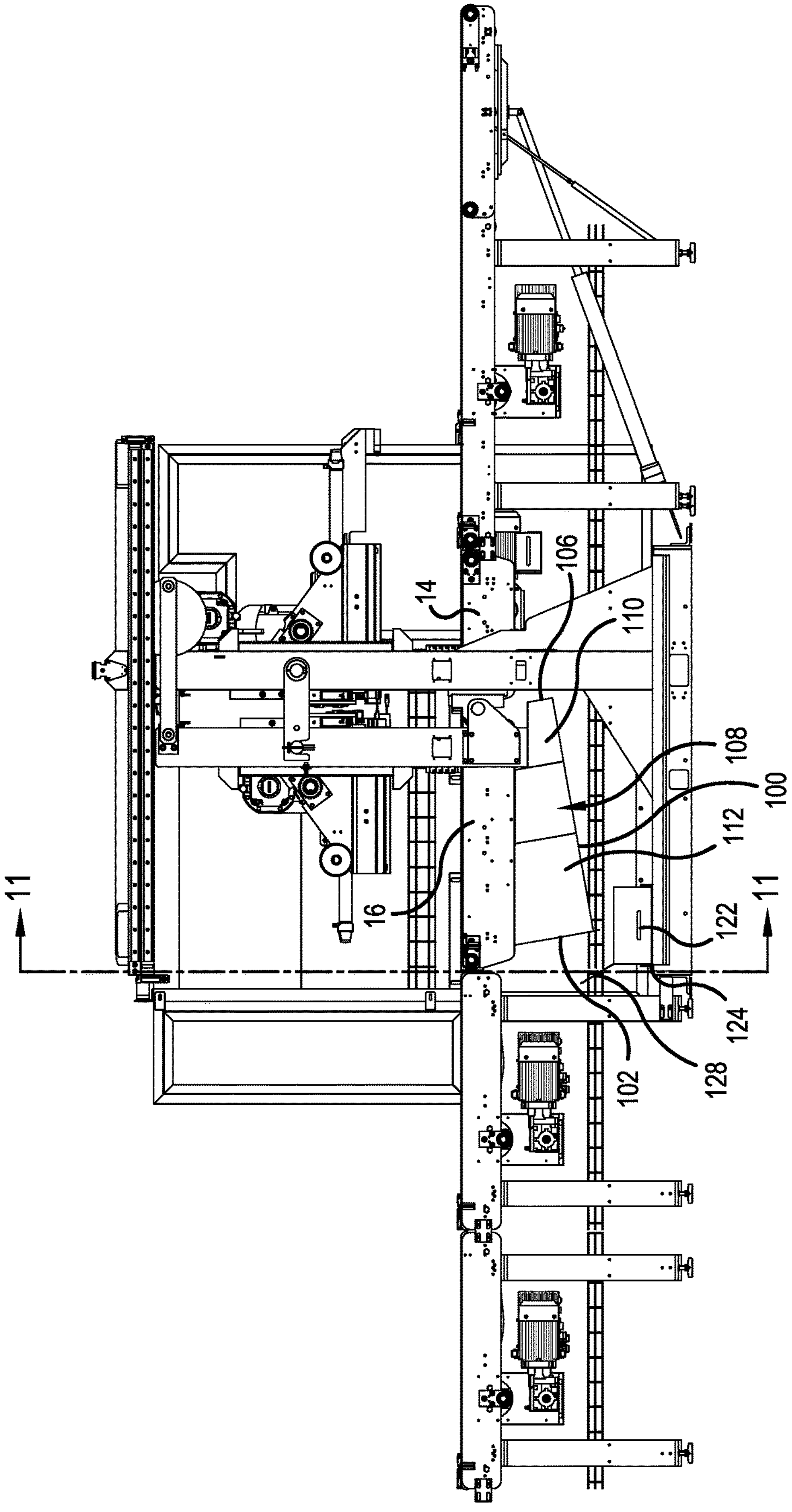
FIG. 10 is a side elevational view of a bundle breaker that includes the scrap chute of FIGS. 6-9 and a scrap drawer with the downstream breaking conveyor in the raised position.
Figure 11:
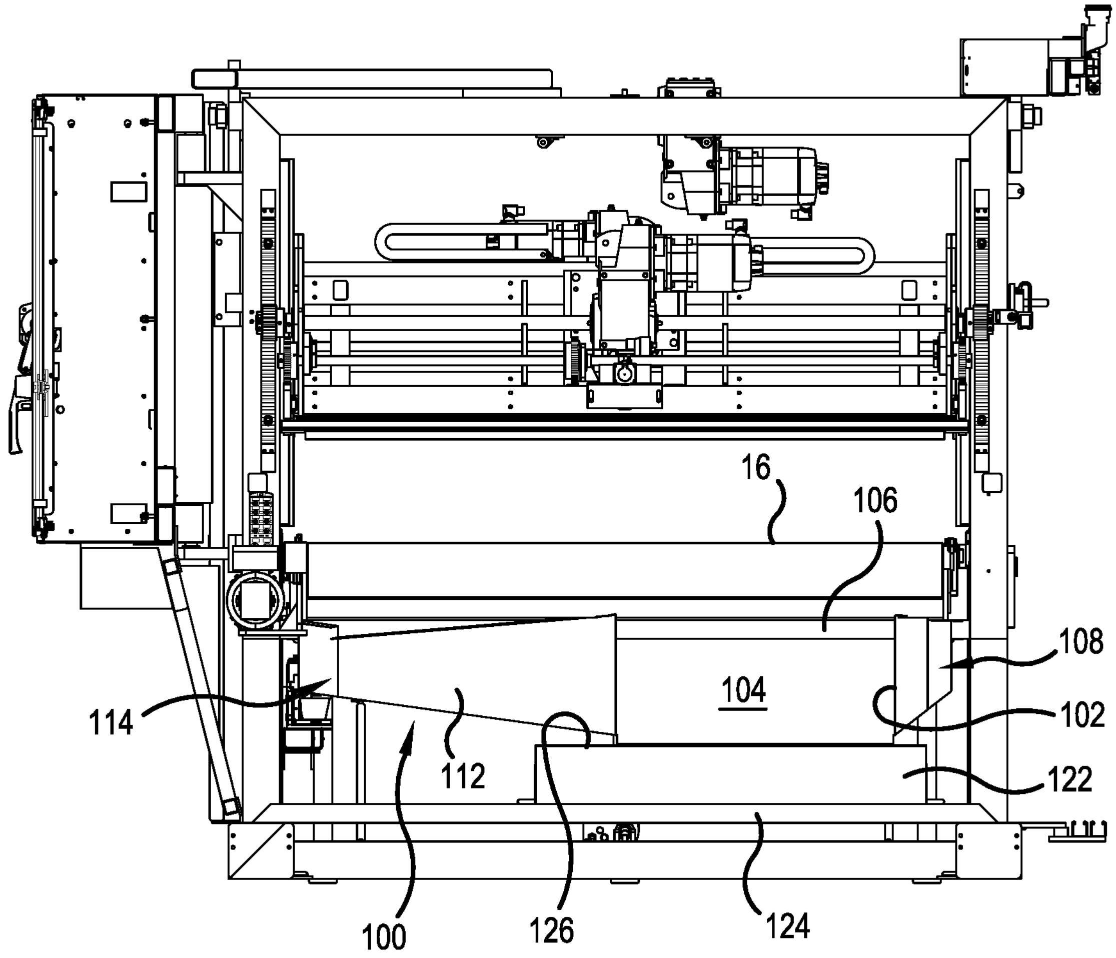
FIG. 11 is an end elevational view taken in the direction of line A-A in FIG. 10.

After a break is complete, the breaking motor 72 reverses direction and rotates the drive disk from the position illustrated in FIG. 4 to the position shown in FIG. 5 thereby returning the top surface of the downstream breaking conveyor 16 to its starting position in substantially the same plane as the top surface of the upstream breaking conveyor 14. The controller C then drives the downstream breaking conveyor 16 to move the separated bundles away from the remaining portions of the logs for further processing. Simultaneously or shortly thereafter, the controller C cause the upstream breaking conveyor 14 and optionally the input conveyor 22 to move the log further downstream until the next bundle to be broken from the logs is located on the downstream breaking conveyor 16 at which point the above cycle repeats.

The present invention has been described herein in terms of a presently preferred embodiment. Modifications and additions to this embodiment will become apparent to persons of ordinary skill in the art upon a reading of the foregoing disclosure. It is intended that all such modifications and additions comprise a part of the present disclosure to the extent they fall within the scope of the several claims appended hereto.

What is claimed is:

1. A bundle breaker having an upstream end and a downstream end and comprising:

an downstream breaking support having an input end and an output end, a first platen located above the downstream breaking support, a first actuator operably connected to the first platen and configured to shift the first platen toward a raised position above the downstream breaking support and toward a lowered position above the downstream breaking support to selectively clamp a first portion of a log between a bottom contact surface of the first platen and the downstream breaking support, an upstream breaking support having an input end and an output end, a second platen located above the upstream breaking support, a second actuator operably connected to the second platen and configured to shift the second platen toward a raised position above the upstream breaking support and toward a lowered position above the upstream breaking support to selectively clamp a second portion of the log between a bottom contact surface of the second platen and the upstream breaking support, a third actuator configured to shift the downstream breaking support relative to the upstream breaking support from a first position to a second position to break the first portion of the log from the second portion of the log, a scrap chute below a junction of the output end of the upstream breaking support and the input end of the downstream breaking support configured to catch scrap material falling between the upstream support and the downstream breaking support, and wherein the scrap chute is mounted to the downstream breaking support so that the scrap chute moves with the downstream breaking support when the downstream breaking support shifts from the first position to the second position.

2. The bundle breaker according to claim 1, wherein the scrap chute has a floor facing the downstream breaking support and at least one side wall extending from the floor toward the downstream breaking support, the at least one side wall having a first end and a second end spaced from the first end to define a discharge opening of the scrap chute.

3. The bundle breaker according to claim 2, including an upstream end wall at an upstream end of the scrap chute.

4. The bundle breaker according to claim 3 wherein the scrap chute comprises a unitary structure formed from sheet metal or plastic.

5. The bundle breaker according to claim 1, including a scrap drawer having a top opening positioned such that scrap exiting the scrap chute through the discharge opening falls into the scrap drawer, wherein the scrap chute includes a discharge opening, and wherein the discharge opening is located a first distance from the top opening when the downstream breaking support is in the first position and is located a second distance from the top opening when the downstream breaking support is in the second position, the second distance being less than the first distance.

6. The bundle breaker according to claim 5, wherein the scrap drawer includes an upstream wall and a downstream wall taller than the upstream wall, wherein a lip depends from the floor of the scrap chute at the discharge opening, wherein when the downstream breaking support is in the first position, the lip is located outside the scrap drawer, and wherein when the downstream breaking support is in the second position, the lip extends into the scrap drawer.

7. The bundle breaker according to claim 6, wherein the scrap drawer is slidably supported by a frame of the bundle breaker, and wherein the downstream breaking support is movable independently of the scrap drawer.

8. The bundle breaker according to claim 1, wherein an upstream end of the scrap chute has a first width substantially equal to a width of the downstream bundle breaker, wherein a discharge opening of the scrap chute has a second width less than the first width, and wherein a portion of the at least one side wall extending from the first end of the at least one side wall is angled relative to the downstream direction to guide scrap toward the discharge opening.

9. The bundle breaker according to claim 1, wherein, when the downstream breaking conveyor is in the first position, an upstream end of the scrap chute extends under the upstream breaking support.

10. The bundle breaker according to claim 1, wherein the upstream breaking support comprises an upstream conveyor and the downstream breaking support comprises a downstream breaking conveyor.

11. The bundle breaker according to claim 1, wherein the scrap chute has a floor facing the downstream breaking support and at least one side wall extending from the floor toward the downstream breaking support, the at least one side wall having a first end and a second end spaced from the first end to define a discharge opening of the scrap chute, and wherein an angle of the floor of the scrap chute relative to a horizontal plane is too small to cause scrap falling into the scrap chute to slide out of the discharge opening when the downstream breaking support is in the first position.

12. The bundle breaker according to claim 11, wherein the angle is about 10 degrees.

13. A bundle breaker having an upstream end and a downstream end and comprising:

a downstream breaking support having an input end and an output end, a first platen located above the downstream breaking support, a first actuator operably connected to the first platen and configured to shift the first platen toward a raised position above the downstream breaking support and toward a lowered position above the downstream breaking support to selectively clamp a first portion of a log between a bottom contact surface of the first platen and the downstream breaking support, an upstream breaking support having an input end and an output end, a second platen located above the upstream breaking support, a second actuator operably connected to the second platen and configured to shift the second platen toward a raised position above the upstream breaking support and toward a lowered position above the upstream breaking support to selectively clamp a second portion of the log between a bottom contact surface of the second platen and the upstream breaking support, a third actuator configured to shift the downstream breaking support relative to the upstream breaking support from a first position to a second position to break the first portion of the log from the second portion of the log, a scrap chute below a junction of the output end of the upstream breaking support and the input end of the downstream breaking support configured to catch scrap material falling between the upstream support and the downstream breaking support, wherein the scrap chute has a floor facing the downstream breaking support and at least one side wall extending from the floor toward the downstream breaking support, the at least one side wall having a first end and a second end spaced from the first end to define a discharge opening of the scrap chute, wherein the scrap chute is mounted relative to the downstream breaking support such that the third actuator shifting the downstream breaking support relative to the upstream breaking support jolts the scrap chute, and wherein an angle of the floor of the scrap chute relative to a horizontal plane is too small to cause scrap falling into the scrap chute to slide out of the discharge opening when the downstream breaking support is in the first position.

14. The bundle breaker according to claim 13, wherein the scrap chute comprises a unitary structure formed from sheet metal or plastic.

15. The bundle breaker according to claim 13, including a scrap drawer having a top opening positioned such that scrap exiting the scrap chute through the discharge opening when the downstream breaking support is in the second position falls into the scrap drawer, wherein the discharge opening is located a first distance from the top opening when the downstream breaking support is in the first position and is located a second distance from the top opening when the downstream breaking support is in the second position, the second distance being less than the first distance.

16. The bundle breaker according claim 15, wherein the scrap drawer includes an upstream wall and a downstream wall taller than the upstream wall, wherein a lip depends from the floor of the scrap chute at the discharge opening, wherein when the downstream breaking support is in the first position, the lip is located outside the scrap drawer, and wherein when the downstream breaking support is in the second position, the lip extends into the scrap drawer.

17. The bundle breaker according to claim 16, wherein the scrap drawer is slidably supported by a frame of the bundle breaker, and wherein the downstream breaking support is movable independently of the scrap drawer.

18. The bundle breaker according to claim 13, wherein an upstream end of the scrap chute has a first width substantially equal to a width of the downstream bundle breaker, wherein a discharge opening of the scrap chute has a second width less than the first width, and wherein a portion of the at least one side wall extending from the first end of the at least one side wall is angled relative to the downstream direction to guide scrap toward the discharge opening.

19. The bundle breaker according to claim 13, wherein the angle is about 10 degrees.

20. The bundle breaker according to claim 13, wherein the upstream breaking support comprises an upstream conveyor and the downstream breaking support comprises a downstream breaking conveyor.

21. The bundle breaker according to claim 13, wherein the scrap comprises corrugated paperboard.

* * * * *